(12) United States Patent
Eicher (10) Patent No.: US 6,807,148 B1
(45) Date of Patent: Oct. 19, 2004

(54) DEMAND DATA DISTRIBUTION SYSTEM (75) Inventor: David E. Eicher, Delhi, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/390,150

(22) Filed: Sep. 3, 1999

(51) Int. Cl.7 ............................................... H04L 12/26
(52) U.S. Cl. ...................... 370/217; 370/221; 370/225; 370/242; 370/250; 725/76
(58) Field of Search ............................. 370/216, 217, 370/218, 221, 222, 223, 225, 250, 242, 244, 245, 259, 260, 261, 262, 264, 265, 270, 432; 725/75, 76, 77, 78, 82

(56) References Cited

U.S. PATENT DOCUMENTS

| | | | | |
|---|---|---|---|---|
| 5,818,512 A | * | 10/1998 | Fuller | ........................... 725/82 |
| 5,973,722 A | * | 10/1999 | Wakai et al. | ................... 725/76 |
| 6,131,119 A | * | 10/2000 | Fukui | ........................... 709/224 |
| 6,157,650 A | * | 12/2000 | Okuyama et al. | ............. 370/401 |
| 6,198,919 B1 | * | 3/2001 | Buytaert et al. | ............. 455/426 |
| 6,226,269 B1 | * | 5/2001 | Brewer et al. | .............. 370/245 |
| 6,266,815 B1 | * | 7/2001 | Shen et al. | .................... 725/76 |
| 6,446,142 B1 | * | 9/2002 | Shima et al. | ................. 710/16 |

\* cited by examiner

Primary Examiner—Dang Ton
Assistant Examiner—Shick Hom
(74) Attorney, Agent, or Firm—Nathan O. Jensen; Kyle Eppele (57) ABSTRACT

A demand data distribution system architecture applicable to data distribution systems and entertainment systems is disclosed. The demand distribution system architecture includes data sources and nodes for receiving data over a high-speed serial data bus such as IEEE 1394. The nodes receive data on demand from the data sources on channels assigned to the nodes. The demand data distribution system includes such fault tolerant features as a loop gate for looping around failed elements of the system.

20 Claims, 5 Drawing Sheets

DEMAND DATA DISTRIBUTION SYSTEM

BACKGROUND OF THE INVENTION

This invention relates to a data distribution system and more specifically to a demand data distribution system with applications to an advanced multimedia entertainment system.

Entertainment systems and more specifically in-flight entertainment systems installed on large aircraft such as airliners have more passenger seats than sources of program material. The programming is continuously broadcast on a pre-assigned channel. For smaller entertainment systems for use in such applications as business jets, the entertainment systems have large numbers of programs with a small number of seats. Using the large aircraft type system in the small aircraft application places large bandwidth requirements on the data distribution system.

Digital interface buses are known in the art for interconnection of computers and other digital devices. Many different serial and parallel interface busses have evolved through the years for a wide variety of applications. Digital multimedia audio and video devices used in computer applications have added, new requirements for a digital high-speed interface bus.

A data distribution architecture for use in entertainment systems and other data distribution systems should have a high degree of fault tolerance to meet new demanding applications. A high-speed serial bus architecture may be organized in a mixture of daisy chain and tree structures. With this architecture any break in the cables between the daisy-chained devices or failure of a device interface function hardware will cause a break in the bus structure. A portion or branch of the tree architecture is no longer part of the network.

What is needed is a data distribution architecture that serves audio, video, and data distribution systems and specifically smaller in-flight entertainment systems. The data distribution system needs to be a fault tolerant high-speed interface bus such that any failure in a cable or a device in the bus structure will not disable a portion of the network. What is needed is a redundant cable to bypass failed portions of the network.

SUMMARY OF THE INVENTION

The present invention relates to a demand data distribution system. The demand data distribution system may be used with multimedia entertainment systems and with multimedia entertainment systems used in aircraft in-flight entertainment systems. The demand data distribution system utilizes a high-speed digital bus such as the IEEE 1394 serial data bus for interconnection of the system. The demand data distribution system has fault tolerant features and employs a loop gate to bypass failed parts of the data distribution system. The demand data distribution system comprises a plurality of nodes that receive data and a plurality of data distribution channels. Each of plurality of nodes has an individually assigned channel for receiving data. A plurality of data sources provides the data to the plurality of nodes over the plurality of channels. Each of nodes selects a data source to provide data on the individually assigned channel. The demand data distribution system includes a bus manager node in the plurality of nodes for controlling the data distribution system. A loop gate node in the plurality of nodes provides loops around failed nodes. The bus manager commands a second node to change to the first node channel if the data source is already broadcasting to the first node. The bus manager and the loop gate work together to determine if a node is failed. The bus manager determines if a node is responding properly and the loop gate checks network traffic at each of its ports. The loop gate attempts to communicate with the bus manager over each of its ports when a failed node is detected. The bus manager shuts down the failed node and the loop gate enables a correct port to reattach the demand data distribution system.

It is an object of the present invention to provide a data distribution system that delivers the data when demanded over a channel assigned to the user.

It is an object of the present invention to provide a data distribution system that is fault tolerant.

It is an advantage of the present invention to provide a demand data distribution architecture that is applicable to entertainment systems.

It is a feature of the present invention to provide a demand data distribution architecture that can bypass failed nodes of the data distribution system.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a demand data distribution system architecture. The invention can be used in data distribution systems. A specific application of the present invention is for an advanced multimedia entertainment system for use in such applications as in-flight entertainment in aircraft. The present invention may incorporate an IEEE 1394 high-speed serial bus or similar data bus for interconnection of the system. The present invention may incorporate a unique loop gate that allows the equivalent of a redundant cable to bypass failed elements of the data distribution or entertainment system. A preferred embodiment of the demand data distribution system architecture incorporating the IEEE 1394 bus in an in-flight entertainment application is disclosed.

IEEE 1394 has been developed to facilitate computer attachment of digital cameras and digital video applications. IEEE 1394 is the lowest-cost digital interface available for audio/video applications such as digital television, multimedia CDROM (MMCD), and home networks.

The IEEE 1394 high-speed serial bus multiplexes a variety of different types of digital signals, such as compressed video, digitized audio, MIDI, and device control commands onto two twisted-pair conductors. IEEE 1394 uses a fairness arbitration approach to assure that all nodes having information to transmit get a chance to use the bus.

Like Ethernet and other high-speed digital data-transmission systems, IEEE 1394 is a layered transport system. The IEEE 1394 standard defines three layers: Physical (PHY), Link, and Transaction. The Physical Layer provides the signals required by the IEEE 1394 bus. The Link Layer takes the raw data from the Physical Layer and formats it into recognizable IEEE 1394 packets. The Transaction Layer takes the packets from the Link Layer and presents them to the application.

Link chips provide all link functions, as well as a limited number of transaction functions. IEEE 1394 Physical Layer and Link Layer chips are available from a number of manufacturers. The remainder of the transaction functions is performed in software.

The IEEE 1394 high-speed serial bus standard specifies a six-wire, lightweight cable including power, two twisted pair conductors, and a small connector designed to be a universal interface for computers, peripherals, and other high-speed equipment. Up to 64 devices can be daisy-chained on one network, with as much as 15 feet between devices. The distance between devices can be extended via a 1394 repeater. The repeater re-drives the 1394 signals. Any number of 64 device networks may be combined by means of 1394 bridges. Bridges isolate the data on each of the device networks and allow selected data transfer between the networks. A 1394 splitter is also available to provide an additional port to a network.

There are two types of IEEE 1394 data transfer: asynchronous and isochronous. Asynchronous transport is the traditional computer memory-mapped, load and store interface. Data requests are sent to a specific address and an acknowledgment is returned. Asynchronous communications will be used for sending commands and control data up and down the network. IEEE 1394 also features a unique isochronous data channel interface. Isochronous data channels allow audio/video data to be streamed down a virtual channel on the network and guarantee just-in-time delivery of data at a pre-determined rate. This is especially important for time-critical multimedia data where just-in-time delivery eliminates the need for costly buffering. With isochronous data transfer, the sender requests an isochronous channel with a specific bandwidth for the desired data rate. Isochronous channel IDs are transmitted followed by the data. The receiver monitors the incoming data's channel ID and only accepts data with the specified ID. System requirements determine how many isochronous data channels are required and their required bandwidth. Up to 64 isochronous channels can be provided with IEEE 1394 system.

Perhaps most important for use as the digital interface for consumer electronics is that IEEE 1394 is a peer-to-peer interface. This allows not only dubbing from one camcorder to another without a computer, but allows multiple computers to share a given camcorder without any special support in the camcorders or computers. All of these features of IEEE 1394 are key reasons why it has become the audio/visual digital interface of choice for consumer electronics and also for in-flight entertainment (IFE) systems for aircraft.

Traditional IFE systems have more passenger seats than sources of program material. This situation drives the need for a broadcast type of architecture. Each audio/video source simply outputs a signal continuously on a pre-assigned channel. As the number of program sources goes up, and the number of program material recipients goes down, there comes a point where a crossover to an alternative approach makes sense. For typical business jets the number of seats range from 7 to 21. The number of program sources is upwards of 25. These requirements drive the need for a new approach for data distribution in business jets and other similar applications.

Figure 1:
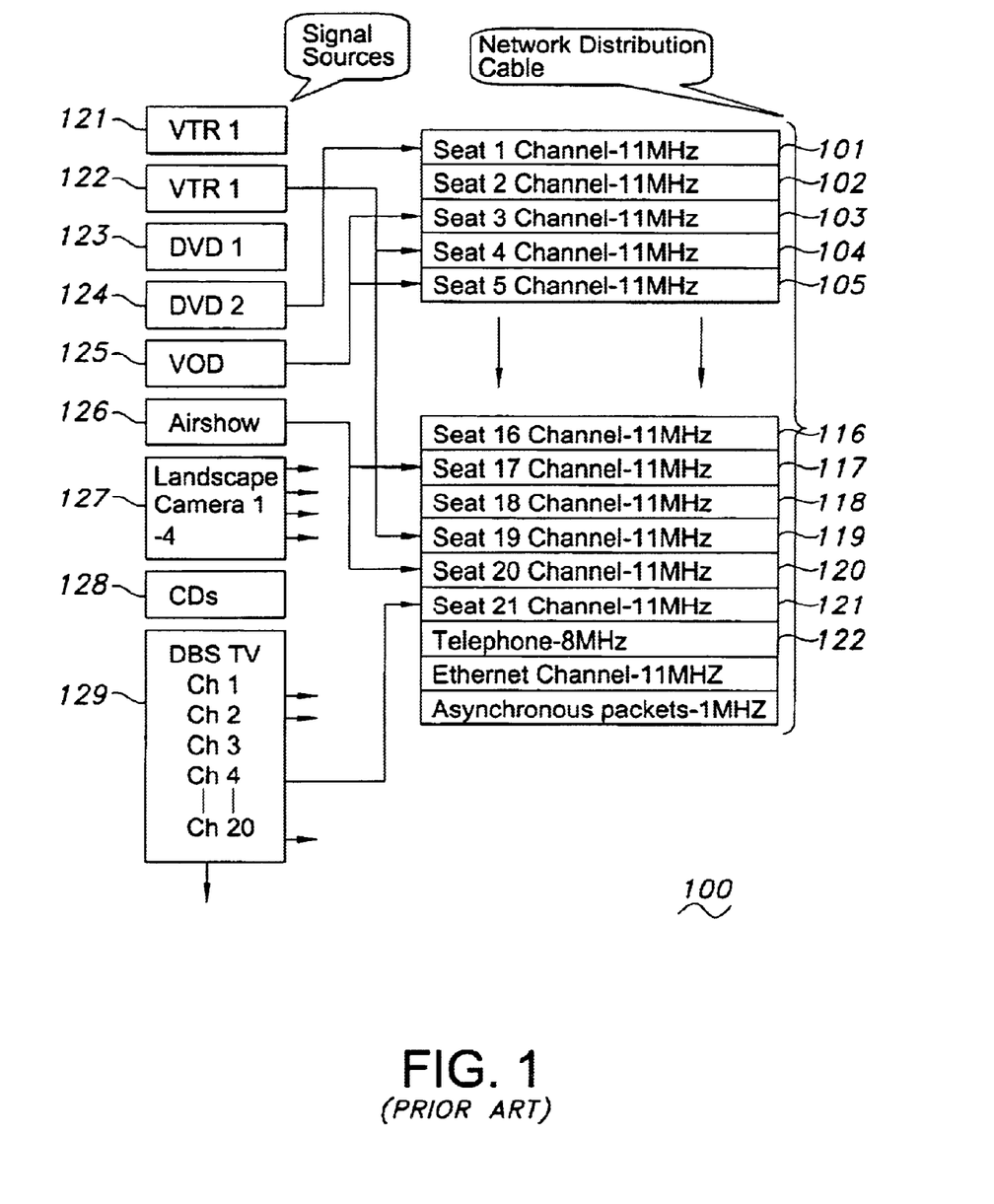
FIG. 1 is a diagram of a demand data distribution system architecture.

The present invention is for a new approach for a demand data distribution system architecture 100 shown in exemplary fashion in FIG. 1 as applied to an advanced multimedia entertainment system. The demand data distribution system architecture uses the IEEE 1394 high-speed digital data bus for interconnection of the system. In order to maintain the bandwidth requirements of the demand data distribution system within manageable limits, an isochronous data channel (101 through 121) is assigned to each of the 21 seats in FIG. 1 with a channel ID for each seat. Other numbers of seats can be used with the present invention. A user at a seat decides what program source (121 through 129) is desired and sends a command over the data bus in the asynchronous data transfer mode. The program source is directed to broadcast the audio/video digital data on the appropriate isochronous data channel for the seat. Each seat monitors the incoming data channel IDs and only accepts data it requested with its own ID. For example if seat 2 on its channel 102 selects video tape recorder 2 (VTR 2) 122, VTR 2 broadcasts its programming material on the seat 2 channel 102. If a second seat, such as seat 16, requests to view the same program source VTR 2 (122) and the program source is already broadcasting on the seat 2 channel 102, the bus manager (not shown) is aware of this, and simply commands seat 16 to begin listening to the isochronous channel (102) designated for seat 2.

Each seat is allocated 11 MHz of bandwidth on the system. This is sufficient to receive MPEG-2 encoded audio/video digital data. If a user chooses to listen to CDs instead of watching an audio/visual (AN) program, the 0.192-MHz wide CD music will easily fit in the 11-MHz channel allocated to that seat.

Figure 2:
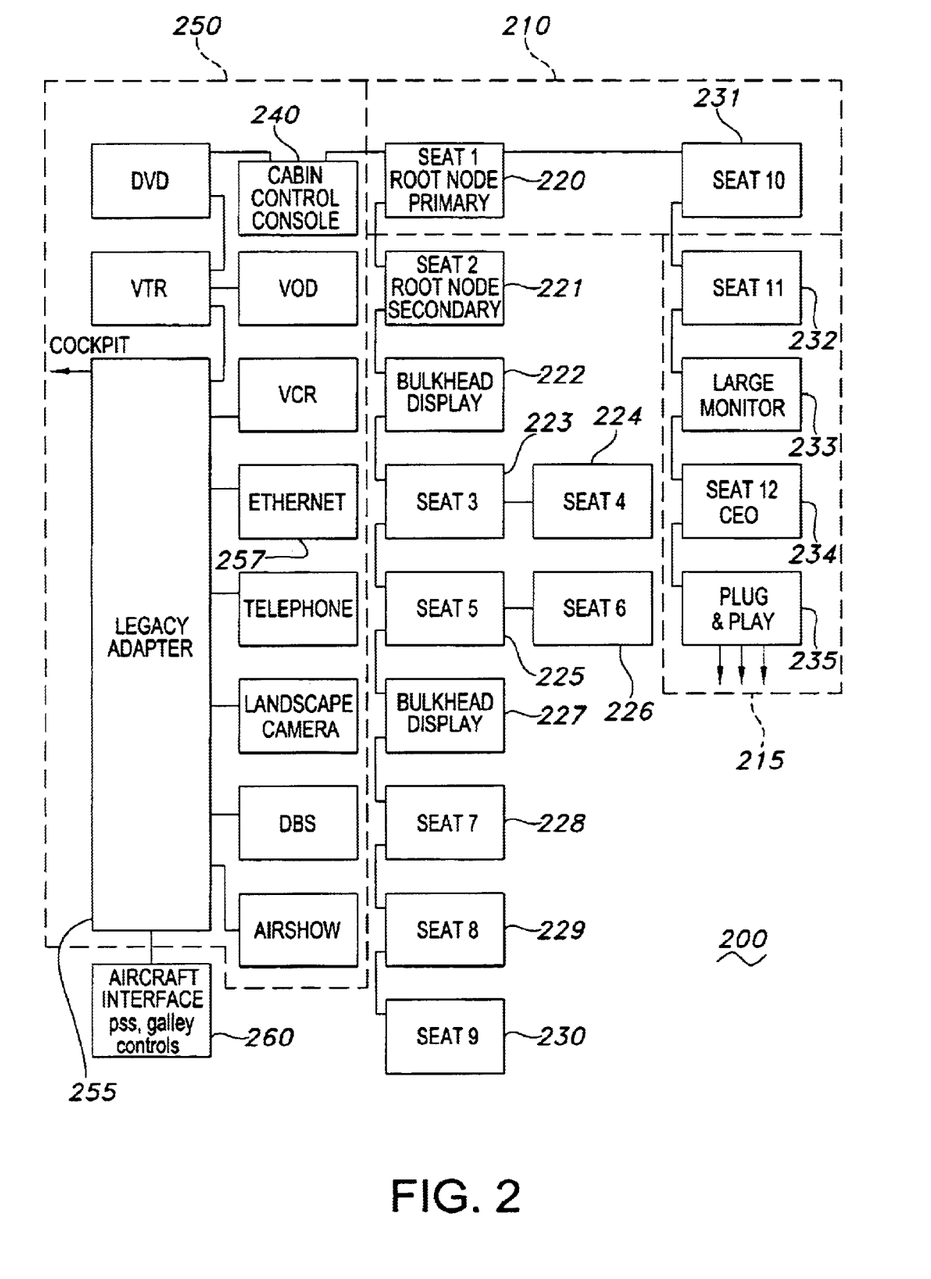
FIG. 2 is a block diagram of an in-flight entertainment system employing a high-speed serial bus that operates using the fault tolerant demand data distribution system architecture of the present invention.

A preferred embodiment of the demand data distribution system architecture is shown in FIG. 2 as an advanced multimedia entertainment system 200. The demand data system architecture may also be used in data distribution systems for purposes other than entertainment. The demand data distribution system architecture 200 is a mixture of tree structures 210 and daisy chain structures 215 in the network. The seats of FIG. 1 and other devices included in the network as shown in FIG. 2 are referred to and function as nodes (220 through 235) in the network. The root node, seat 1 (220) in this example, is the bus manager for the network 200. The root node 220 may also be the cycle master for isochronous data transfers. The root node 220 has the highest natural priority during arbitration that allows it to gain access to the bus the quickest. It takes time to arbitrate up a long daisy chain so multiple branches of a tree structure helps to reduce end-to-end arbitration time and therefore overhead. A multiple port root node computer may be used to perform the role of network management while reducing the depth of any one branch of the tree. The root node hereinafter is referred to as the bus manager.

The cabin control console 240 may be located with the program source equipment 250 in the galley area of the aircraft. For redundancy the cabin control console function may be reassigned to any other display on the data bus that has a touch screen and menus that allow for management of the entire system.

A legacy adapter unit 255 in FIG. 2 is used to adapt existing program source equipment not compatible with the IEEE 1394 bus to the bus. The program source equipment 250 includes video data sources, such as VCRs, direct broadcast satellite TV, and digital data sources. The legacy adapter unit 255 provides an Ethernet interface 257 for digital data transfers. A lap top computer may be plugged in at a seat to interface the Ethernet and be on the Internet.

A plug & play capability may be made available by placing a node 235 with access ports at the end of one of the branches of the demand data distribution network. Since the system architect has no control over the data rate capability of a plug & play device 235, it must never be placed in the middle of a branch. This will ensure that a 100-MHz or 200-MHz device will not impose a bottleneck on the network. All nodes that are 400-MHz capable are also 100-MHz and 200-MHz capable by definition so they can communicate with the slower devices but care must be taken to ensure that a slower device is never required to repeat higher rate data.

During system initialization each node (220 through 235) on the network 200 will report its speed capabilities and other important information about itself. Each node (220 through 235) has access to a topology database on the bus manager node 220. Thus each node knows what devices are on the network, what data rates they operate at, and what other capabilities they offer.

As long as a few of the above mentioned rules are followed, the IEEE 1394 bus allows significant flexibility as to how the devices are interconnected. An interconnection scheme can be created for specific aircraft that minimizes the length of runs between nodes 220 through 235.

Figure 3:
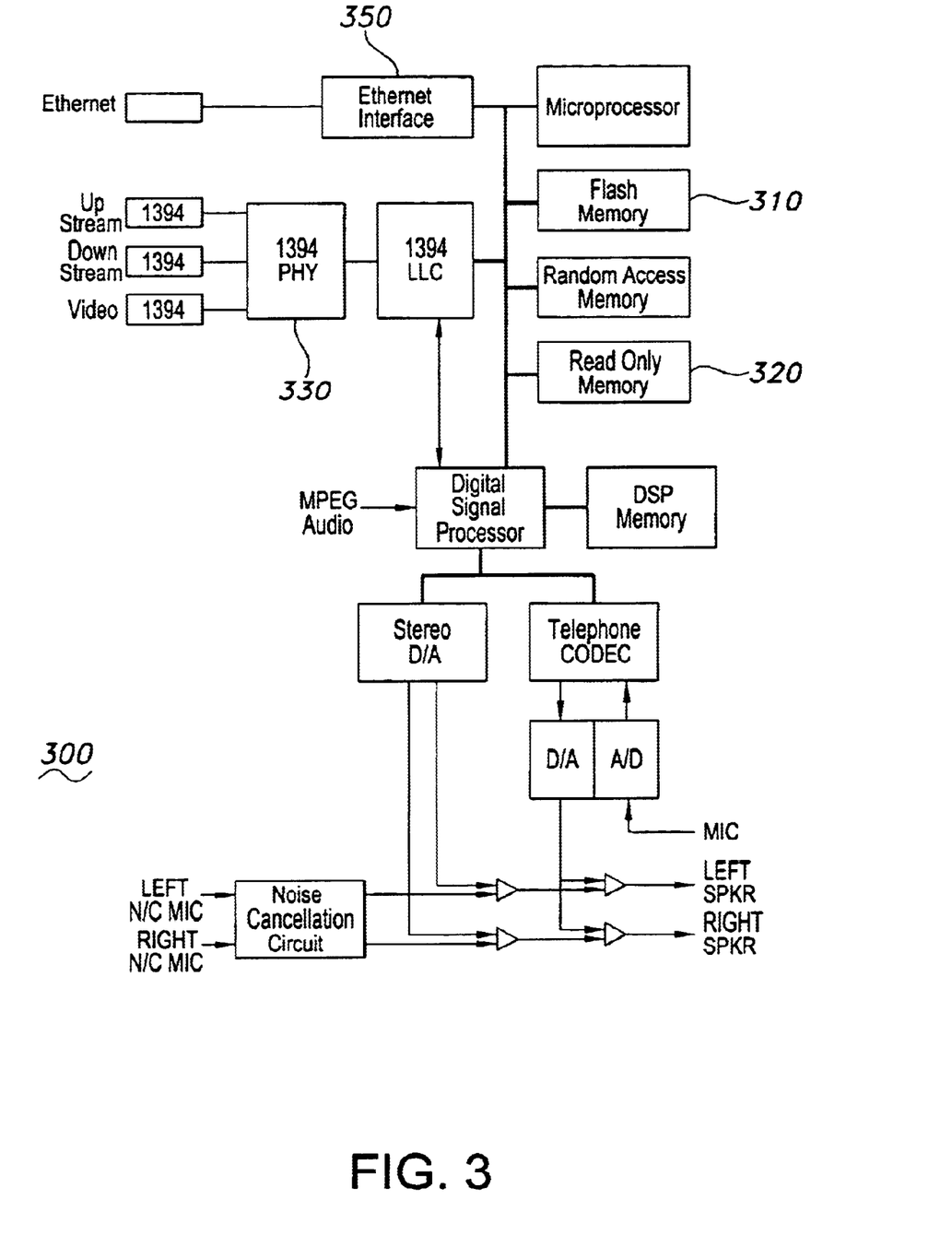
FIG. 3 is a block diagram of a VIP control panel as used in the in-flight entertainment system embodiment of the present invention.

Each node 220 through 235 is a self-contained computer with peripherals. Each node 220 through 235 has a reprogramability feature. The equipment installed at each seat node may include a VIP (very important person) control panel, a display screen with a touch control, headphones, and a microphone. A block diagram of the VIP control panel 300 is shown in FIG. 3 and is used as an example to describe the construction of a typical node 220 through 235 of FIG. 2. Application software for the VIP panel 300 resides in a flash ROM 310. Software for reprogramming the VIP panel resides in a permanent ROM 320. When a node powers up for the first time, it begins execution from the permanent ROM 320. If the software in the permanent ROM 320 detects a valid application in the flash ROM 310, it transfers control to that software. If a command to reprogram is received by the application over the network, control is transferred back to the permanent ROM 320. The flash ROM 310 is bulk-erased, and the new application is received over the network and programmed into the flash ROM 310. Once the reprogramming is complete, the flash ROM 310 is write-disabled and locked to prevent accidental erasure or data loss. This approach allows features and functions to be added with ease throughout the system. It also allows the network to optimize itself by moving functions from node to node based on utilization and available throughput. Also shown in FIG. 3 is an Ethernet interface 350 allowing direct interfacing to the Ethernet from a seat.

When the network powers up, tree identification (ID) and node ID initialization occurs. During the node ID phase, information about each node is broadcast on the network. This information is very detailed, and may include node computer processor throughput capability, memory size, application size, and available peripherals (video screen and touch screen for a display node, switches and audio processing for VIP panels, etc.). The bus manager 220 of FIG. 2 maintains a database of this capability that can be accessed by each node on the network. This allows dynamic allocation of functions and features throughout the network. A user at seat 10 (231) might be playing a simple game that is running on the VIP panel for seat 1 (220) just because there is excess throughput capability there, maybe no one is sitting there.

The demand data distribution system architecture has been designed to provide for a high degree of fault tolerance. This is due in part to the chosen architecture and in part to the nature of the IEEE 1394 interface bus. The IEEE 1394 bus is a peer-to-peer based architecture and the general theme is distributed processing. The approach chosen for the demand data distribution architecture is consistent with this theme. The tolerance of the system to a failure can be examined at several different levels as described in the following paragraphs Each node 220 through 235 in FIG. 2 will have BIT (built in test) software that will run at power up initialization and a PM (performance monitor) portion that will monitor node performance during normal operation. Each node will periodically send an asynchronous message to the bus manager 220 reporting the state of its health. If a node fails to check in within a configurable amount of time, the bus manager 220 can issue a command to the faulty node to shut it down. This will eliminate any chance of the node interfering with other network activity.

The bus manager node 220 provides several services to the demand data distribution bus. The bus manager 220 publishes a function map that can be accessed by other nodes that Indicates what role each node plays in the network. For example, node 3 might be the display for seat 11 (232) and node 9 is a VIP panel for seat 7 (228) in FIG. 2. The bus manager 220 publishes a topology map that can be accessed by other nodes. The topology map includes the parent/child relationships relative to node number. The bus manager (220) also publishes a speed map that can be read to find the maximum speed for each cable segment that is attached between two nodes. In addition the bus manager (220) provides power management control, optimizes bus traffic, publishes a table of BIT and PM results collected from the network, serves as the isochronous resource manager (IRM), serves as the cycle master for isochronous data transfers, and forces the role of root node for the network on itself. The bus manager 220 also serves as program source manager for the demand data distribution network by accepting commands from seats and controlling the program sources accordingly.

Almost any level of redundancy can be achieved with the demand data distribution system architecture. The number of bus managers can be selected for a given application. This number of bus managers corresponds to seat nodes that may be "root ready". "Root ready" means the seat nodes are equipped with sufficient hardware and software to offer the services outlined above. In the example in FIG. 2, two nodes are root ready, one is programmed to be primary bus manager 220, the other is a backup or secondary bus manager 221.

The secondary bus manager 221 is programmed to send a WATCHDOG message to the primary bus manager 220 periodically. The message rate is configurable. The primary bus manager 220 responds with a status of its health. If the status indicates a problem, or the response is absent altogether, the secondary bus manager 221 can issue a shutdown command to the primary bus manager 220, then issue a bus reset. This will force the secondary bus manager 221 to become the root node and take over the bus management duties. Isochronous transfers will be suspended for a short time during this transition but asynchronous transfer interruption will not be noticeable.

The layered architecture of the IEEE 1394 bus has intrinsic insulation properties between layers. When the application running on a node (220 through 235) has a failure, there is a strong probability that the PHY (physical layer that actually communicates with the cable of the network) Layer (330 in FIG. 3) will still be operational. The PHY Layer 330 can be powered from the bus cable power so even if a node has a catastrophic hardware failure or loses power, the PHY Layer is probably still operating. This is important because the IEEE 1394 bus depends on the PHY Layer of each node to repeat data up and down the network. In the unlikely event that a PHY Layer did fail, the performance monitor data that is accumulated by the bus manager 220 would provide an indication to the cabin crew which node was faulty. The crew would be instructed to remove that node from the network, then normal operation will resume, the only effect is that one node is lost.

Figure 4:
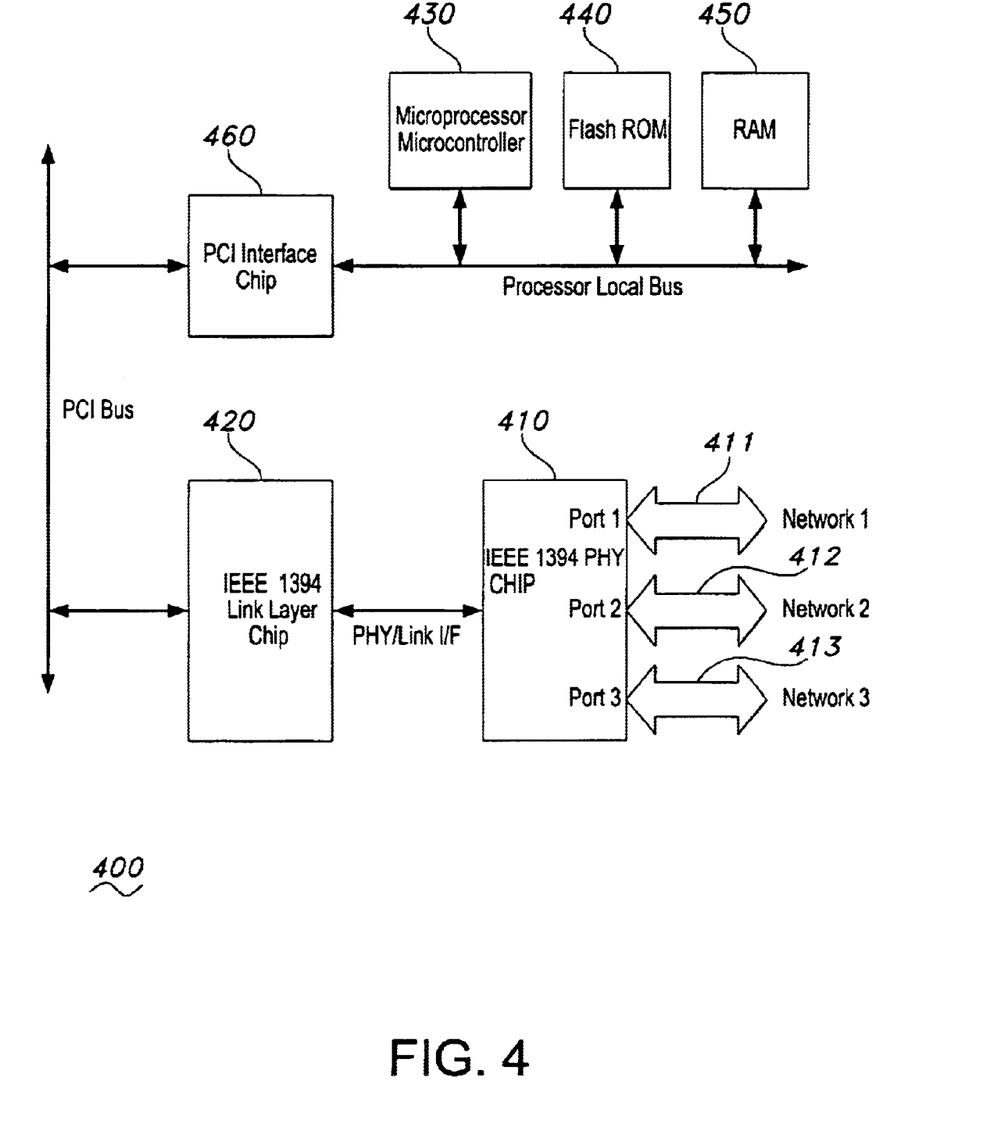
FIG. 4 is a block diagram of a loop gate.

The equivalent of a redundant cable can be achieved with the demand data distribution system architecture without incurring the cost and weight of addition cable on the aircraft. This is accomplished by means of a function called a loop gate. An example of a loop gate node 400 is shown in FIG. 4 in block diagram form. The loop gate 400 consists of an IEEE 1394 PHY chip 410 for interfacing the data distribution network through three ports 411 through 413. An IEEE 1394 Link Layer chip 420 provides Link Layer functionality to the PHY chip 410 and an interface to the microprocessor 430 and its environment by means of a PCI bus. The loop gate 400 microprocessor 430 environment consists of a flash ROM 440 where boot code and applications software are stored, a RAM 450 for volatile data storage, and a PCI interface 460. Note that all of these elements are contained in the VIP panel block diagram of FIG. 3. The loop gate function may be hosted on a standard seat node in the aircraft in the form of applications software. This would eliminate the need for unique hardware to implement the loop gate function.

Loops in IEEE 1394 networks are not allowed. If a loop is detected the tree ID phase of initialization fails to complete and the bus stalls out. This condition is detectable by properly programmed nodes and can be reported to maintenance personnel. A loop gate is a node that has the capability to close a loop but does not choose to do so unless a branch of the tree network is first broken, specifically in the event of a node failure. If a node has a failure in the PHY Layer (330 in FIG. 3) of its hardware to the point were its repeater function is no longer able to perform its function, the network is broken at that point and two pieces of the network are created. The bus manager can send a command to that node using one of its functioning ports to disable the offending port. If the PHY Layer 330 circuitry has not failed in a manner that renders the bus "stuck" at some voltage (the most likely case since the driver and disable circuit is the closest circuit to the network cable). At this point two unconnected buses exist.

Figure 5:
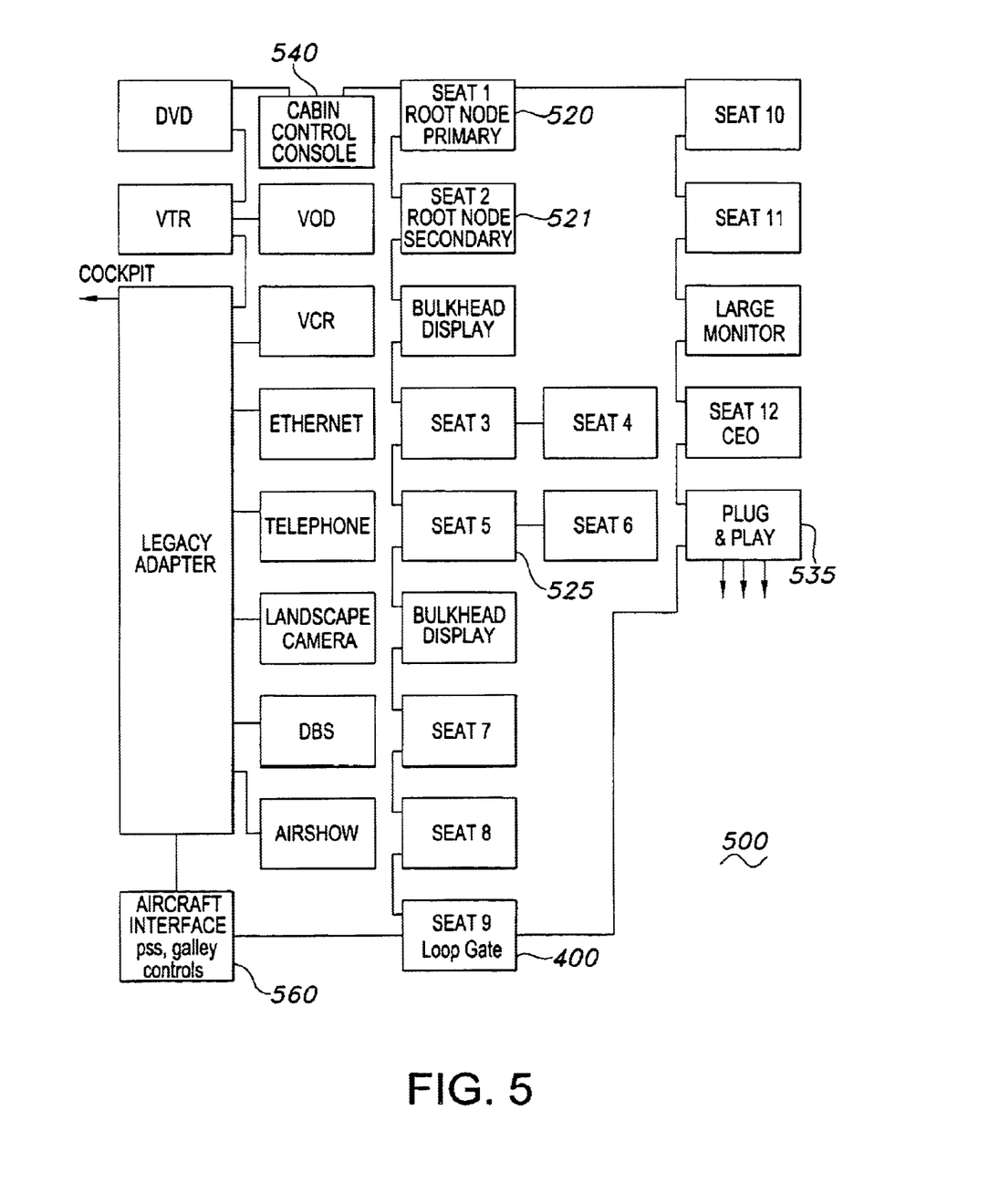
FIG. 5 is the block diagram of FIG. 2 employing the loop gate of FIG. 4 to loop around failed parts of the demand data distribution architecture.

The demand data distribution system network architecture 500 in FIG. 5 is identical to that of FIG. 2 except that a loop gate function 400 has been added to the VIP panel in seat 9 (230). All functions and elements shown in FIG. 2 and described in conjunction therewith are incorporated in FIG. 5. This loop gate function 400 offers alternative bus architectures in the event of a failure. For example assume that the VIP panel node of seat 5 (525) in FIG. 5 has failed. In the architecture of FIG. 2 the aft bulkhead display 227 and seats 7 through 9 (228 through 230) would lose contact with the network. In the architecture of FIG. 5, the loop gate 400 and bus manager 520 would work together to detect this situation. The bus manager 520 maintains a database of PM (performance monitor) data that would indicate that a node is not responding properly. Similarly, the loop gate 400 is periodically checking network traffic at each of its ports. The loop gate 400 can only have one port enabled at a time to prevent creating an actual loop. A communication with the bus manager 520 is attempted on each leg of the network. This corresponds to each port (411–413 in FIG. 4) on the device. If the bus manager 520 can't respond on a given leg, the loop gate 400 can troubleshoot the defective leg using a local copy of the topology map for the network.

At this point the defective node 525 is shut down by the bus manager 520 and the loop gate 400 then enables the correct port to re-attach the pieces of the broken network. PM data is then logged so maintenance personnel have visibility to the situation and repairs can be effected. In most cases only the defective node loses functionality.

In the event that the PHY Layer that fails has a failure that locks the bus (stuck at 1, stuck at 0) even after it has been disabled, a different recourse is employed. The defective node 525 is replaced with a repeater block. A repeater block is simply a PHY Layer in a box, it performs a repeater function and nothing more. Spares can be stored on an aircraft for this purpose and they can be switched in during flight without shutting down the system. This too ensures that only the defective node loses functionality, the remainder of the network performs as though nothing happened.

The tree ID phase of initialization begins at "leaf" nodes. The loop gate 400 is inserted in place of a leaf node. A leaf node is a node that has only one port connected to the bus. The reason for this is as follows. Tree ID signaling is accomplished by means of combinations of signaling voltages on the data and strobe lines. One combination is called a "parent$_{13}$ notify", which is intended to signal to a node that it believes that node is closer to the root than the signaling node. A "child$_{13}$ notify" is yet another combination of voltages that is used to signal a node that it is a child of the signaling node. The rule all nodes follow for tree identification is "Wait until all ports except one have received a "parent_notify". After a bus reset, the only nodes that have this rule satisfied are leaf nodes. Compare FIG. 5 to FIG. 2 once again. Nodes that were leaf nodes 230, 235, and 260 in the architecture of FIG. 2 no longer appear to be leaf nodes 400, 535, and 560 in FIG. 5. Nodes 235 and 260 still function as leaf nodes until a failure occurs in the network. The loop gate 400 functions as leaf node and monitors network traffic at its ports to detect failures as previously described.

When the loop gate PHY chip 410 in FIG. 4 starts signaling after a bus reset, all ports will be enabled. This appears to be true for the available IEEE 1394 chips today; maybe next generation chips will behave differently. The application software running on the loop gate 400 must immediately disable all but one port on the PHY chip (411–413). Because some time will be required to get these ports disabled, the tree ID process will be delayed somewhat. After the disable occurs, those nodes connected to the disabled ports will report "no connect" in their PHY Layers. At this point the PHY Layer will figure out that conditions are satisfied to signal "parent$_{13}$ notify" to the nodes connected on their only remaining ports. Since the tree ID process happens on the order of tens of microseconds, this delay might be significant. A node arbitration timeout occurs in approximately 167 microseconds. Since the host processor 430 in FIG. 4 might not be able to get the ports disabled this quickly, a timeout is possible that will result in a deadlock condition. Application software will detect this condition and deal with it.

The first step in dealing with it is to disable all ports of the loop gate 400 except one. The applications on every node must check for a timeout. If one is detected, the bit can be cleared in the PHY Layer and the tree ID process will be attempted again. This time it should proceed as desired. The bus manager node 520 in FIG. 5 will force itself to be the root and serve as the primary bus manager, the secondary bus manager 421 will be prepared to step in and take over if required.

Consistent with the theme of the IEEE 1394 bus architecture, the built-in-test function is distributed throughout the demand data distribution network. Each node will have BIT (built in test) software that will run at power up initialization and a PM (performance monitor) portion that will monitor node performance during normal operation. This data is communicated to the bus manager for the BIT database. Power-up BIT will test computer hardware and interfaces at the node and provide a status. PM will monitor things such as CPU throughput margin, memory usage, and node power consumption.

The primary node bus manager 520 in FIG. 5 will maintain a database of BIT and PM data. It will perform a periodic analysis of the data and decide if there are conditions that should be reported to the cabin crew. When an alert condition exists, a message is sent to the cabin control console 540 for displaying. A chime in the cabin control console 540 may also indicated an alert condition. Any display on the network with an input device (such as a touch screen) can be configured as the cabin control console, a display that is physically located near the program source equipment will offer the most utility. If the cabin crew requests a network performance status, a system BIT/PM status will be sent to the console.

A properly equipped laptop may be brought on board the aircraft and plugged into a plug & play connector 535 on the demand data distribution network. Properly equipped means equipped with an IEEE 1394 interface and the appropriate maintenance software. Besides examining BIT/PM data and analysis, the laptop computer may perform more extensive analysis on the data and can update application software on any of the nodes. It may also add features and functions or move applications from node to node. The maintenance software will be able to perform the function of a bus analyzer. The bus analyzer can monitor the bus, and develop a map of throughput characteristics on a leg by leg basis. This map can present bus bandwidth utilization by leg in both isochronous and asynchronous categories. The analyzer can optimize bus performance by tuning subaction gaps, arbitration rules, and other bus timing characteristics as a function of how the bus is being used and the current topology.

It is believed that the demand data distribution system architecture of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A demand data distribution multimedia entertainment system comprising:
 a plurality of program sources for providing audio/video data;
 a data bus connected to the plurality of program sources said data bus transferring command and control data in an asynchronous mode and transferring the audio/video data in an isochronous mode; and
 a plurality of nodes connected to the data bus for sending and receiving command and control data and audio/video data on the data bus said plurality of nodes comprising seat nodes having isochronous channels with channel identifications assigned to each of said seat nodes wherein one of said seat nodes is a root node and said root node is programmed as a bus manager node for controlling the data bus;
 wherein a first node of the plurality of nodes selects in the asynchronous mode a first program source of the plurality of program sources for transmission of the audio/video data on an isochronous channel assigned to the first node and when a second node of the plurality of nodes selects the first program source of the plurality of program sources said second node switches to the isochronous channel assigned to the first node.

2. The multimedia entertainment system of claim 1 wherein another of said nodes in the plurality of nodes comprises a secondary root node and is programmed as a secondary bus manager node for controlling the data bus.

3. The multimedia entertainment system of claim 1 further comprising a loop gate node wherein said loop gate node is inserted in place of a leaf node of the plurality of nodes and said loop gate node further comprises a plurality of ports for closing a loop around a failed node.

4. The multimedia entertainment system of claim 1 wherein the bus manager node commands the second node to switch to the isochronous channel assigned to the first node.

5. The multimedia entertainment system of claim 1 wherein one of the nodes in the plurality of nodes further comprises an input device and a display and functions as a cabin control console for management of the multimedia entertainment system.

6. The entertainment system of claim 1 wherein the data bus comprises tree structures and daisy chain branch structures and is an IEEE 1394 high-speed serial bus system with isochronous channels in accordance with the IEEE 1394 high-speed serial bus system said tree structures and daisy chain structures further comprising display nodes and the seat nodes.

7. The multimedia entertainment system of claim 1 wherein the bus manager node publishes a function map indicating what role each node in the plurality of nodes performs.

8. The multimedia entertainment system of claim 1 wherein each of the plurality of nodes further comprise built in test software that runs on power up initialization, monitors performance during operation, and periodically sends an asynchronous message to the bus manager node to report the state of each node.

9. The multimedia entertainment system of claim 8 wherein the bus manager node shuts down one of said nodes when the periodically sent asynchronous message is not received from said node.

10. A demand data distribution multimedia entertainment system comprising:
 a plurality of program sources for providing audio/video data;

a data bus connected to the plurality of program sources said data bus transferring command and control data in an asynchronous mode and transferring the audio/video data in an isochronous mode;

a plurality of nodes connected to the data bus for sending and receiving command and control data and audio/video data on the data bus said plurality of nodes comprising seat nodes having isochronous channels with channel identifications assigned to each of said seat nodes wherein one of said seat nodes is a root node and said root node is programmed as a bus manager node for controlling the data bus; and a loop gate node wherein said loop gate node is inserted in place of a leaf node of the plurality of nodes and said loop gate node further comprises a plurality of ports for closing a loop around a failed node.

11. The multimedia entertainment system of claim 10 wherein the bus manager node and the loop gate node work together to determine if one of said nodes is failed.

12. The multimedia entertainment system of claim 11 wherein the bus manager node determines if one of said nodes is responding properly and the loop gate node checks traffic at each of it plurality of ports.

13. The multimedia entertainment system of claim 12 wherein the loop gate node attempts to communicate with the bus manager node over each of its plurality of ports when said failed node is detected.

14. The multimedia entertainment system of claim 13 wherein the bus manger node shuts down the failed node and the loop gate node enables a correct port to reattach the multimedia and entertainment system.

15. A demand data distribution system comprising:

a plurality of nodes said plurality of nodes comprising seat nodes;

a data bus said data bus for interconnecting the nodes and further comprising a plurality of channels each of said seat nodes having an individually assigned channel for receiving data;

a plurality of data sources for providing the data to the plurality of nodes over the plurality of channels each of said seat nodes selecting a one of said data sources to provide the data on the individually assigned channel;

a bus manager node wherein said bus manager node is one of said seat nodes in the plurality of nodes for controlling the demand data distribution system; and a loop gate node in the plurality of nodes for looping around failed nodes.

16. The demand data distribution system of claim 15 wherein the bus manager node commands a second node to change to a first node channel if the data source is already broadcasting to the first node.

17. The demand data distribution system of claim 15 wherein the bus manager node and the loop gate node work together to determine if one of said nodes has failed.

18. The demand data distribution system of claim 17 wherein the bus manager node determines if one of said nodes is responding properly and the loop gate node checks network traffic at each of its ports.

19. The demand data distribution system of claim 18 wherein the loop gate node attempts to communicate with the bus manager node over each of its ports when said failed node is detected.

20. The demand data distribution system of claim 19 wherein the bus manger node shuts down the failed node and the loop gate node enables a correct port to reattach the demand data distribution system.

* * * * *